Aug. 3, 1954
J. AVINS
2,685,673
HIGH-FREQUENCY TEST PROBE
Filed July 28, 1949
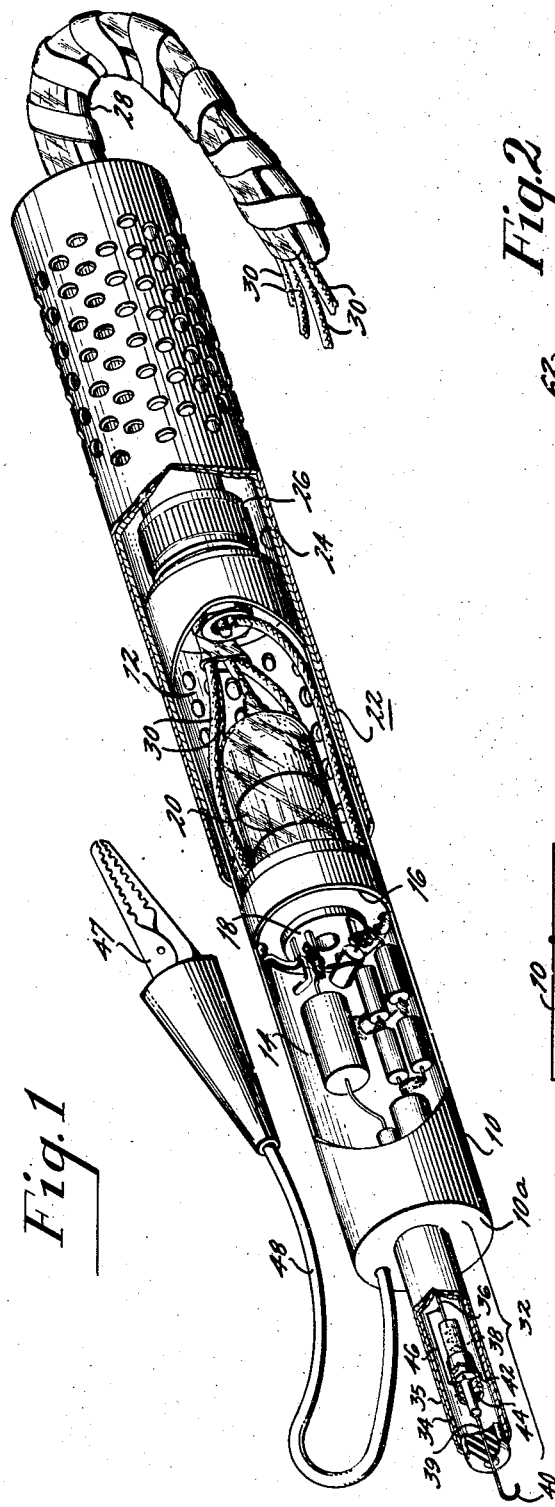
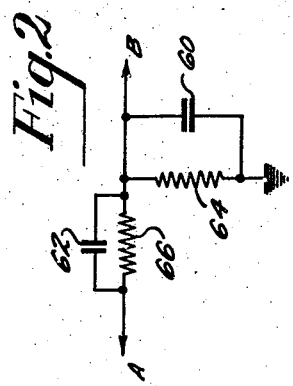
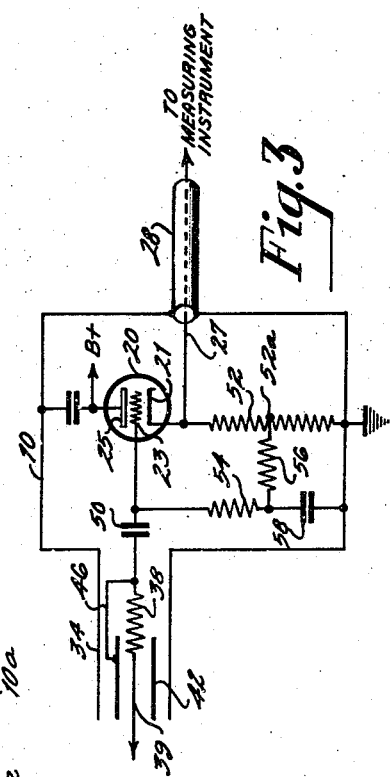
INVENTOR
Jack Avins
BY
ATTORNEY Patented Aug. 3, 1954

2,685,673

UNITED STATES PATENT OFFICE 2,685,673

HIGH FREQUENCY TEST PROBE

Jack Avins, New York, N. Y., assignor to Radio Corporation of America, a corporation of Delaware Application July 28, 1949, Serial No. 107,326

4 Claims. (Cl. 324—72.5)

This invention relates to improvements in electrical test probes, and particularly to an improved test probe for high frequency testing and measuring procedures.

In high frequency testing and measuring, the problem of connecting the measuring instrument to the circuit under investigation is complicated by factors which are relatively negligible in low frequency applications. For example, in testing television equipment, radar systems, and other apparatus involving operating frequencies of several megacycles or more, an unshielded wire is not a satisfactory coupling element for connecting a measuring instrument to the circuit being tested since it may act as a "receiving antenna" and pick up voltages radiated from other parts of the circuit. On the other hand, a coaxial cable or similar shielded conductor will present objectionable amounts of shunt capacity to the tested circuit.

It has previously been proposed to reduce the shunt capacity effect of the shielded cable by means of a compensated capacitance-reducing network, with the elements of the network being mounted in a "probe" which is connected to the end of the cable remote from the measuring apparatus. The probe serves both as a housing for the capacitance network elements and as a conveniently rigid unit for making contact at difficultly accessible circuit test points.

It is a principal object of the present invention to provide an improved test probe of the foregoing type, and one which is particularly adapted for high frequency test and measuring.

A further object of the invention is the provision of a test probe adapted to present minimum shunt capacity to high frequency circuits under test.

Another object of the invention is the provision of an improved high frequency test probe circuit which will give maximum isolation yet minimum signal attenuation between a circuit test point and a measuring apparatus.

Another object of the invention is the provision of a substantially distortionless, high input impedance, signal coupling network.

In accordance with one feature of the invention, certain of the foregoing and other objects and advantages are attained by the provision of a shield member located within the probe in a position to reduce undesired capacitances in the probe while serving as one plate of a necessary capacitor in the probe circuit.

In accordance with a further feature of the invention, objectionable distortion is substantially eliminated in a high input impedance coupling network of the self-biased cathode follower type by provision of a filter between the cathode and grid circuits of the follower.

A more complete understanding of the invention can be had from the following description of an illustrative embodiment thereof, when considered in connection with the accompanying drawing, wherein:

Fig. 1 is a perspective view of one form of probe embodying my invention, with certain of the parts broken away to show constructional details.

Fig. 2 is a schematic diagram of a compensated capacitance-reducing network illustrating certain features of the invention.

Fig. 3 is a schematic diagram of a preferred circuit for the probe shown in Fig. 1.

Referring to Figure 1 of the drawing, a probe embodying the features of my invention comprises a cylindrical metal shield member 10 effectively divided into two sections or compartments 12, 14 by a partition 16, in which is mounted a tube socket 18 to support an electron tube 20 in endwise relation in one probe compartment 12. Portions of the cylinder wall adjacent the compartments 12, 14 preferably are cut away to allow easy access to circuit elements mounted in the compartments 12, 14.

An insulating sleeve 22, having a conductive inner surface 24, is adapted to slide over the metal cylinder 10 to facilitate handling of the probe and to form a continuation of the metal cylinder 10 over the cutaway portions thereof. In order to avoid overheating of the tube 20, both the cylinder wall 10, adjacent the tube compartment 12, and that portion of the sleeve 22 which will overlie the tube compartment 12 when the parts are in assembled relation, are provided with apertures to allow free circulation of air through the tube compartment.

A coaxial cable fitting (not shown), mounted in the cylinder endwall adjacent the tube compartment 12, is adapted to connect to a complimentary fitting 26 on a coaxial cable 28, while a plurality of conductors 30 are brought through the same cylinder end wall and extend through the partition 16 to prongs on the tube socket 18 to supply energizing voltages from a suitable source (not shown) to the tube 20. The cable 28 is intended to carry test voltages picked up with the probe to any suitable testing or measuring instrument (not shown) such as a voltmeter, an oscilloscope, or the like, it being understood that the cable shield will be connected to a reference potential point (e. g. "ground") at the measuring instrument.

The remaining compartment 14 in the cylinder 10 contains various circuit elements connecting the tube 20 and the cable 28 to a probe tip 32. For convenience, the elements in the compartment 14 will be described in detail in connection with the probe circuit description given hereinafter.

The probe tip 32 includes a cylindrical shield member 34 which is smaller in diameter than the shield cylinder 10 although forming a continuation thereof. The tip cylinder 34 preferably is covered with a layer 35 of insulating material to avoid the possibility of contact between the cylinder 34 and points on the circuit being tested.

The tip 32 contains a lead-in conductor 36 which extends from the circuit elements in the probe compartment 14 to one end of a resistor 38, and a further conductor 39 which extends from the other end of the resistor 38 to an external circuit-contact point 40. According to an important feature of the invention, a cylindrical shield member 42 is mounted in the tip 32 surrounding a portion of the conductor 39 between the resistor 38 and the external contact point 40. The shield 42 is insulated from the conductor 39 by a dielectric spacer or insert 44, and is connected by a conductor 46 to the lead-in conductor 36, so that the conductor 39 and the shield 42 comprise plates of a capacitive coupling element in shunt with the resistor 38. The advantages of this arrangement will be brought out hereinafter.

An "alligator" clip 47 is connected by a conductor 48 to the shield end wall 10a to facilitate making temporary connections between the shields 10, 34 and a point of reference potential in the circuit being tested.

As was previously mentioned, the use of a shielded cable between a circuit test point and a measuring apparatus will present enough shunt capacity at the circuit test point to interfere with normal operation of the tested circuit at high frequencies. The most effective method of reducing this shunt capacity is to connect a small capacitor in series between the circuit test point and the measuring apparatus. To illustrate this, there is shown in Fig. 2 a hypothetical coupling network between a circuit test point A and a remote measuring point B. Assuming that a capacitor 60 represents the combined input capacity of a shielded cable and a measuring apparatus at B, all of which normally would be in shunt with the circuit test point A, it can be seen that a capacitor 62 connected in series between the test point A and the capacitor 60 will reduce the capacity between point A and ground. If the capacitive voltage-divider comprising the capacitors 60, 62 is to have a uniform frequency response across a reasonable range of frequencies, due regard must be had for the measuring instrument input resistance, which is represented as a resistor 64 in Fig. 2. Consequently, a resistor 66 must be connected in parallel with the capacitor 62, and, for proper compensation, the product of the resistance and the capacitance of the elements 62, 66 should be equal to the resistance-capacitance product of the elements 60, 64.

While the foregoing method of reducing adverse shunt capacity is theoretically satisfactory, as a practical matter I have found that conventional arrangements of the capacitor 62 and the resistor 66 in a test probe are not entirely satisfactory, because the capacity which exists in usual test probes between the probe shield and the circuit components immediately adjacent to point A forms a shunt capacitor between point A and ground, partially offsetting the beneficial effects of the capacitor 62. Consequently, in accordance with the invention, the capacitor 62 of Fig. 2 is provided in the manner shown in Fig. 1, and comprises the conductor 39, the dielectric insert 44, and the intermediate shield member 42, as previously described. The beneficial features of this arrangement derive from the fact that the capacity between the conductor 39 and the shield 34 (ground) is significantly reduced by the use of the intermediate shield 42; furthermore the capacity between the input conductor 39 and the shield 42 forms the input condenser 62 (Fig. 2) and, thus, functions to reduce the input capacity to the measuring network. The capacity between the intermediate shield 42 and the outer shield 34 in Fig. 1 will be in shunt with the capacity 60 of Fig. 2, and will, therefore, be of little consequence.

In the network of Fig. 2, it can be seen that the amount of capacitance to be provided by the capacitor 62 is a matter of compromise. It is desirable to make the capacitor 62 small in order to reduce the capacity between point A and ground as much as possible, yet the voltage-divider effect of the two capacitors 60, 62 is such that the minimum size of the capacitor 60 will depend on the amount of attenuation that can be tolerated between points A and B. In other words, the capacitor 62 should be quite small, yet the ratio between the capacitor 62 and the capacitor 60 should be made as large as possible. Hence, for a given attenuation, the size of the capacitor 62 will depend on the size of the capacitor 60. While a probe containing only the elements shown in the probe tip 32 in Fig. 1 will be satisfactory in many cases, it is preferable to reduce the shunt capacitor 60 of Fig. 2 as much as possible in order to reduce the attenuation between points A and B. In Fig. 3, there is shown a preferred probe circuit for accomplishing the desired result, and one which can be assembled conveniently in the probe shown in Fig. 1.

In the circuit of Fig. 3, a relatively large blocking capacitor 50 is connected between the lead-in conductor 36 and the control grid 23 of an electron tube 20. The tube 20 is connected in a cathode-follower type circuit, wherein the tube anode 25 is connected directly to a supply voltage source B+ (not shown), while the tube cathode 21 is connected to ground (i. e. the shield 10) through a tapped load resistor 52, and also to the center conductor 27 of a coaxial cable 28 which leads to a measuring instrument (not shown). The tube grid 23 is returned to a tap point 52a on the cathode load resistor 52 through a grid resistor 54 and a filter resistor 56, while a filter capacitor 58 is connected between ground and the junction of the grid resistor 54 and the filter resistor 56.

A cathode follower circuit is advantageous in a signal transfer network of the type being described since the inherently low input capacitance of such a circuit will provide a low value of capacitance for the capacitor 60 in Fig. 2. However, a conventional cathode follower arrangement is not entirely satisfactory when used in conjunction with a probe network of the type shown in Fig. 2 due to the somewhat unusual nature of the input circuit through which signal voltages must pass in reaching th cathode follower.

In Fig. 3, the resistance corresponding to the resistor 64 in Fig. 2 will be the input resistance of the cathode follower circuit. This input resistance must be large to prevent excessive loading of the circuit under test. That is, the grid resistor 54 (Fig. 3) must be relatively large, making it desirable to use self-bias for the cathode follower, although the amount of bias required usually will be less than the total voltage drop across the cathode resistor 52.

It can be shown that the input resistance of a self-biased cathode follower circuit, in which the grid resistor is returned to a tap on the cathode load resistor, will vary with variations in the level of the input signal supplied thereto. The significance of this phenomenon, as far as the circuit of Fig. 2 is concerned, is the same as though the resistance of the resistor 64 were to vary with signal variations at point A. If the resistor 66 were considerably smaller than the resistor 64, such variations would have little effect on the signal voltage at point B. However, with the resistor 66 being several times larger than the resistor 64, as is necessary for proper compensation, the signal at point B will be distorted greatly by effective variations in the value of the resistor 64. Consequently, in the network of Fig. 3, it is necessary to prevent changes in the amplification of the cathode follower at the tap point 52a from affecting the input resistance of the tube, by placing a decoupling resistor 56 between the grid resistor 54 and the tap point 52a, and to ground the grid resistor 54, as far as alternating voltage is concerned, through a large capacitor 58. Thus, the combined capacitance-reducing arrangement and cathode follower circuit shown in Fig. 3 comprises a substantially distortionless coupling network which will provide maximum isolation yet minimum signal attenuation between a signal voltage source and a signal utilization device.

In a typical case, the input capacity of the tube 20 in Fig. 3 may be of the order of eight $\mu\mu$farads, the capacity between the conductor 39 and the shield 42 may be of the order of 1.5 $\mu\mu$farads, and the resistors 38 and 54 may have values of the order of 4.5 megohms and 900,000 ohms, respectively, providing an effective input capacity at the probe tip of the order of 1.8 $\mu\mu$farads with a signal attenuation ratio of the order of six-to-one. These figures, while purely illustrative, can be taken as typical of the results attainable with a test probe constructed in accordance with the invention.

What is claimed is:

1. An electrical test-probe for picking up high frequency alternating voltage from selected points in an electrical device to be tested without interfering appreciably with the operation of said device, said test-probe comprising a first conductive member having a free end adapted to be placed in contact with said selected points, a completely shielded conductor adapted to be connected to a remote testing point, a resistor, a circuit including said resistor connecting said first conductive member to said shielded conductor, a second conductive member insulated from and partially surrounding said first conductive member and connected to a point in said circuit between said resistor and said shielded conductor thereby to form in shunt with said resistor a capacitor having plates comprising said first and said second conductive members, a conductive cylindrical housing insulated from and completely surrounding said second conductive member and said circuit, said shielded conductor comprising a metallic shield insulated from said conductor, and means to electrically connect said shield and said housing to each other and to ground.

2. In an electrical test-probe for picking up high frequency alternating voltage from selected points in an electrical device without interfering appreciably with the operation of said device, the combination of a first conductive member having a free end adapted to be placed in contact with said selected points, a resistor connected to said first conductive member, relatively inner and outer electrically conductive shield members insulated from each other, said inner shield member being insulated from and surrounding a portion of said first conductive member adjacent to said resistor and shielding said first conductive member from said outer shield member, a connection from said inner shield member to the end of said resistor remote from said first conductive member and providing in shunt with said resistor a capacitor, said capacitor having plates comprising said first conductive member and said inner shield member, said outer shield member completely surrounding said inner shield member, and means to connect said outer shield member to ground.

3. A test-probe for connecting a measuring instrument to a high frequency circuit, said probe comprising a substantially rigid conductor having a free end adapted to be connected to a circuit test point, a completely shielded conductor adapted to be connected to a test instrument, a resistor connecting said rigid conductor to said shielded conductor, relatively inner and outer shield members, said inner shield member being insulated from and surrounding a portion of said rigid conductor adjacent to said resistor and being connected to said resistor at the end thereof which is connected to said shielded conductor thereby to shield said rigid conductor from said outer shield member and to provide in shunt with said resistor a capacitor having plates comprising said rigid conductor and said shield member, said outer shield member being arranged to form a shielding housing insulated from and completely surrounding said resistor and said inner shield member, said shielded conductor comprising a metallic shield, and means to connect said metallic shield to said shielded housing and to ground.

4. In a probe for connecting a measuring instrument to selected points in a high frequency circuit, the combination of a conductive cylindrical shield member, a substantially rigid conductor coaxially mounted in said shield member and insulated therefrom and having a free end extending through a wall thereof for making connections to test points in said high frequency circuit, a resistor element, a signal transfer circuit including said resistor connected to said conductor within said shield, a second conductive shield member mounted within said cyilndrical shield member between said cylindrical shield member and said conductor and insulated therefrom whereby to shield said conductor from said cylindrical shield member, means connecting said second shield member to said resistor at an end thereof remote from said conductor to provide in said signal transfer circuit and in shunt with said resistor a capacitor having plates comprising said rigid conductor and said second shield member, and means to connect said cylindrical shield member to ground.

References Cited in the file of this patent

UNITED STATES PATENTS

| Number | Name | Date |
|---|---|---|
| 2,111,710 | Loon | Mar. 22, 1938 |
| 2,246,331 | White et al. | June 17, 1941 |
| 2,448,378 | Livingston | Aug. 31, 1948 |
| 2,483,410 | Grieg et al. | Oct. 4, 1949 |

FOREIGN PATENTS

| Number | Country | Date |
|---|---|---|
| 599,844 | Great Britain | Mar. 22, 1948 |

OTHER REFERENCES

Electronics for January 1047, article entitled Graphical Solutions, by H. L. Krauss.

Radio News for March 1945, article entitled Servicemen's Multimeter, by W. C. Hunter.

Radio News for March 1946, article entitled R. F. Probe Design.